Patented Oct. 13, 1953

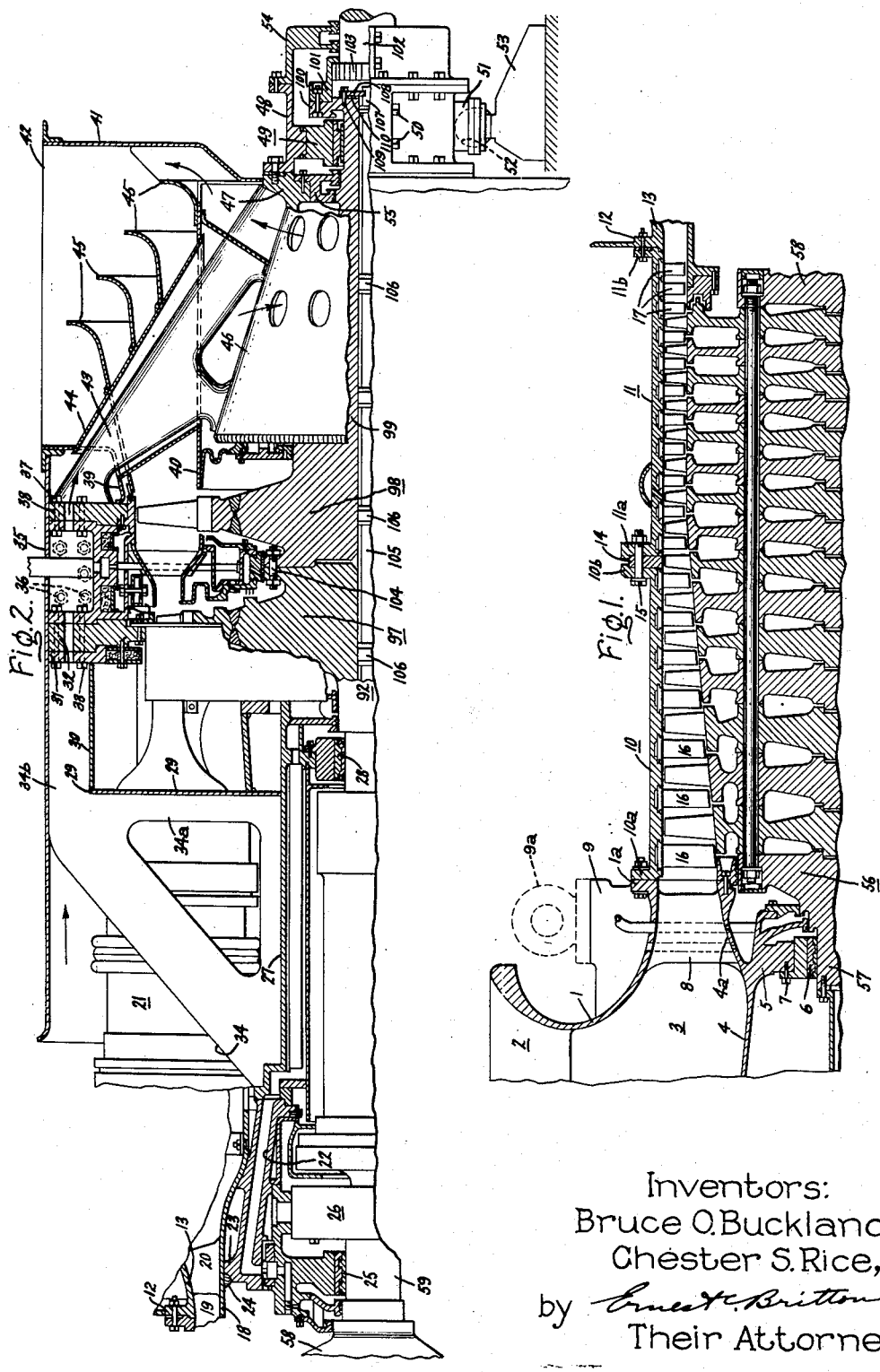

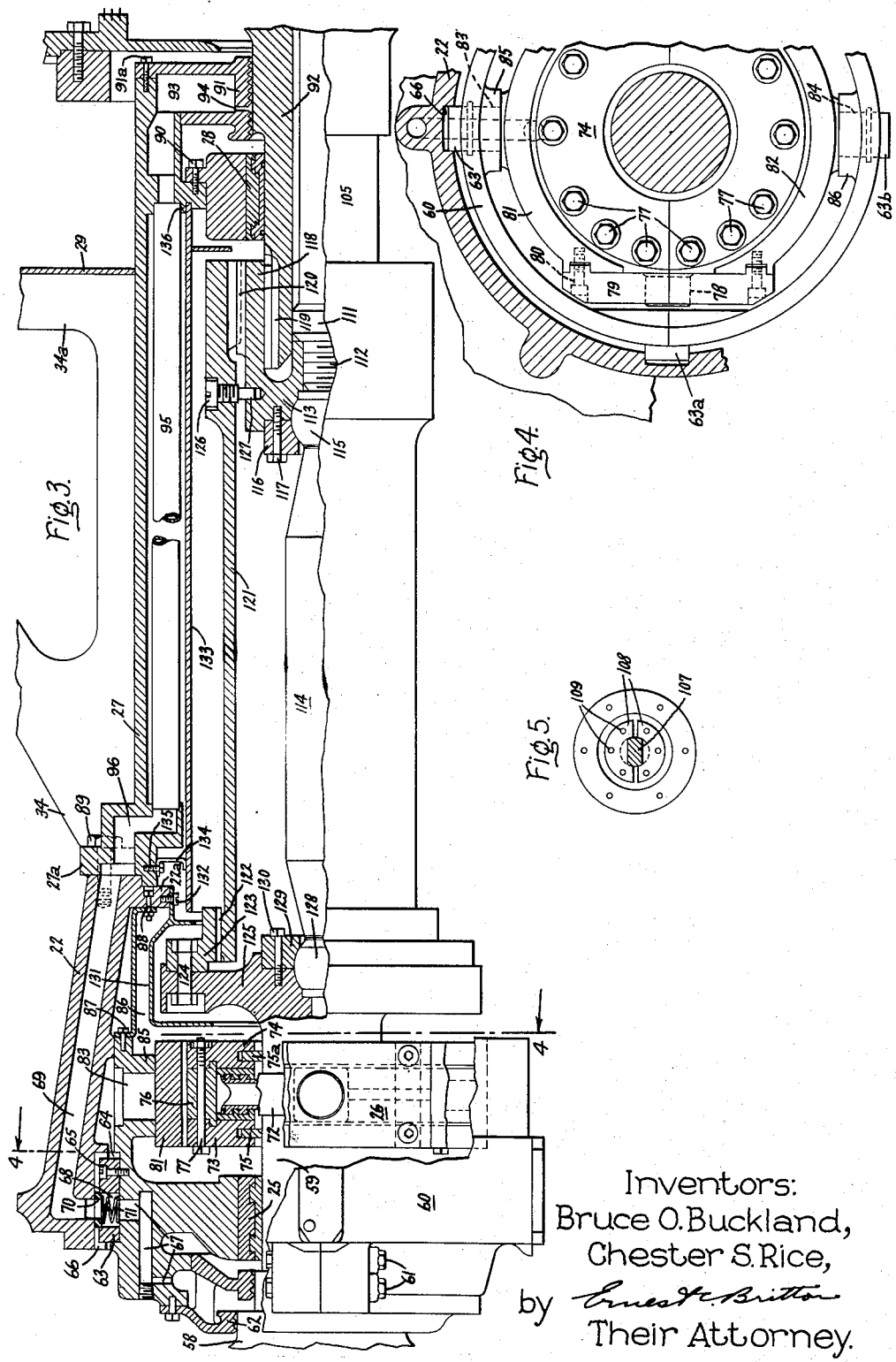

2,655,307

UNITED STATES PATENT OFFICE 2,655,307

GAS TURBINE ROTOR ARRANGEMENT

Bruce O. Buckland and Chester S. Rice, Schenectady, N. Y., assignors to General Electric Company, a corporation of New York Original application June 11, 1947, Serial No. 754,002. Divided and this application February 1, 1951, Serial No. 208,961

6 Claims. (Cl. 230—116)

This invention relates to gas turbine powerplants, particularly to a novel rotor arrangement for such a powerplant including an axial flow compressor rotor of substantial axial length supported by a journal bearing at either end thereof, a multi-stage turbine rotor of substantial axial length supported by a journal bearing at either end thereof, a single thrust bearing for locating the rotor assembly in an axial direction, a special thrust link for locating the two rotor portions axially relative to each other, and special means readily adjustable from the exterior end of the powerplant for shifting one of the rotors axially relative to the other so as to maintain the clearances between rotor and casing at a desired value.

This is a division of an application Serial No. 754,002, filed June 11, 1947 in the names of Alan Howard, Chester S. Rice, and Bruce O. Buckland, and assigned to the same assignee as the present application.

Generally, the object of the invention is to provide an improved composite rotor arrangement for a compact integral gas turbine powerplant especially adapted for mobile applications in marine craft and locomotives. In such applications it is particularly desirable that the gas turbine powerplant be a self-contained unit so as to facilitate the mounting of the plant on the frame of the ship or locomotive, without the necessity for complicated high temperature piping and troublesome expansion joints. The powerplant to which this invention relates has a rigid frame-work capable of maintaining accurate bearing alignment and in turn being adapted to be supported at three points so as to be unaffected by deflections in the frame of the craft in which the powerplant is mounted. The special frame-work of this powerplant is described more completely in United States Patent 2,591,399 issued March 31, 1953 in the names of Bruce O. Buckland and Alan Howard. The three-point support for the powerplant is described in United States Patent 2,632,997 issued March 31, 1953 in the names of Alan Howard and Bruce O. Buckland, both assigned to the same assignee as the present application.

In a powerplant of the type described, having comparatively long cylindrical combustors aligned between the discharge end of a multistage axial flow compressor and the inlet of a multi-stage turbine, it is inevitable that the overall length of the powerplant will become so great that at least three, and usually four or more, journal bearings will be required to support the compressor and turbine rotors. The most obvious bearing arrangement would be to have two bearings for each rotor, with one thrust bearing associated with each rotor for locating it in an axial direction and absorbing the thrust loads arising from the operation of the compressor and turbine respectively. A specific object of the present invention is to provide a gas turbine rotor assembly so arranged that only one thrust bearing is required, with special means for locating both rotors from this single thrust bearing.

In a gas turbine powerplant it is important that the turbine and compressor rotors be located in an axial direction very accurately relative to the respective stator members. This is particularly true of the turbine rotor, since axial positioning of the bucket-wheels relative to the turbine nozzles has an influence on turbine efficiency; and at the same time it is particularly difficult to maintain the required turbine rotor clearances by reason of the high temperatures in that part of the powerplant. Accordingly, it is a still further object of the invention to provide novel means for adjusting the turbine rotor axially relative to the compressor rotor, this adjustment being effected from the exterior end of the powerplant without substantial disassembly thereof.

Other objects and advantages will become apparent from the following description, taken in connection with the accompanying drawings, in which Fig. 1 is a view partly in section of the compressor rotor, Fig. 2 is a sectional view showing the turbine rotor and the frame and bearing structure therefor, Fig. 3 is a detailed sectional view of the thrust link arrangement connecting the compressor and turbine rotors, Fig. 4 is a transverse view partly in section of the thrust bearing assembly, and Fig. 5 is a detail of the arrangement for adjusting the turbine rotor axially.

Generally, the invention is practiced by providing the compressor and turbine with journal or other suitable radial type bearings at the respective ends of each rotor, with a single thrust bearing associated with the compressor rotor at the end adjacent the turbine rotor, a thrust link assembly for transmitting torque between the turbine rotor and the compressor rotor and for positioning the turbine rotor axially with respect to the compressor, and providing special means at the exterior end of the turbine rotor for effecting axial adjustment thereof.

Referring now more particularly to Fig. 1, the compressor assembly includes an inlet casing, shown partly at 1, having an air inlet opening 2 communicating with the annular compressor inlet passage 3, the inner wall of which is formed by a substantially cylindrical wall 4, which is cast integral with the support ring 5 carrying a first journal bearing 6. This journal bearing may be of any conventional babbitt-lined or other suitable type, and may be secured by suitable threaded fastenings 7 to the casing portion 5. Extending across the compressor inlet passage 3 are a plurality of circumferentially spaced vanes 8 formed integral with the outer wall of casing 1 and with the inner wall 4a, which latter is a continuation of the frame cylinder 4 and forms the inner boundary of the compressor inlet passage. Cast integral with the top outer wall of the inlet casing 1 is a boss 9 to which may be secured a lifting eye, shown in dotted lines at 9a for handling the compressor or the complete powerplant.

The casing of the axial flow compressor comprises two sections 10, 11, each section being divided into two halves along a longitudinal horizontal plane and secured together by suitable threaded fastenings (not shown). The left-hand end of the casing section 10 is provided with a circumferential flange 10a bolted to a cooperating flange 1a on the compressor inlet casing 1. The right-hand end of casing section 10 is provided with a circumferential flange 10b bolted to a cooperating flange 11a on casing section 11. The right-hand end of section 11 has a flange 11b bolted to the main radially extending frame flange 12, which is welded to, or formed integral with, an intermediate frame casing member, a portion of which is shown at 13 and illustrated more completely in Fig. 2.

By reason of the fact that the divided casings 10, 11 are firmly bolted to the respective continuous integral flanges 1a, 12, the inlet and exit ends of the divided compressor casing are caused to preserve their true circular shape regardless of temperature changes which may occur during the operation of the machine. As may be seen in Fig. 1, the intermediate compressor stator flanges 10b, 11a do not contact each other directly but are formed with a cylindrical rabbet in which is disposed a continuous ring member 14 extending entirely around the compressor. As will be apparent from the drawing, the bolts 15 pass through the flanges 10b, 11a and through the solid ring 14. This arrangement insures that the mid-portion of the compressor stator will also be caused to maintain its true circular shape regardless of thermal or stress distortions during operation. Thus the comparatively long axial flow compressor casing is divided into sections which are easy to fabricate and assemble to form a very rigid integral frame for the compressor. This is particularly important, since when mounted in a locomotive or marine installation it is intended to support the plant by three fittings with the compressor casing in overhung relation to the main support members, which means that the divided compressor casing structure must support the comparatively heavy compressor inlet casing 1 and certain powerplant accessories fastened thereto (not shown).

The above-described compressor stator structure is described more completely in the copending application Serial No. 754,002, filed June 11, 1947, of which the present application is a division. It may be noted, however, that the compressor stator sections 10, 11 are provided with a total of fifteen circumferential rows of stationary compressor blades 16, which may be secured in circumferential grooves in the stator sections by means of suitable dove-tail portions formed on the blade bases. At its discharge end, stator section 11 is provided with three circumferential rows of turning vanes 17, which are arranged to divert the compressor discharge air into a uniform axially directed flow.

Referring now to Fig. 2, the intermediate casing 13 serves a number of purposes. An inner annular wall 18 cooperates with the outer wall to form the annular compressor discharge passage 19, across which extend six radial circumferentially spaced struts 20. The walls 13, 18 form a diffusing transition section communicating with a plurality of circumferentially spaced combustors, one of which is shown partly in elevation at 21. Although there may be any suitable number, in this powerplant there are six combustors spaced circumferentially around the axis of the plant. The construction of these is not necessary to an understanding of the present invention, being disclosed more fully in the United States Patent 2,547,619 of Bruce O. Buckland, Serial No. 62,333, filed November 27, 1948 and assigned to the same assignee as the present application.

Cast integral with, or fabricated separately and welded into, the casing 13 is a substantially cylindrical but somewhat tapering frame member 22. This frame member has a radially projecting portion 23 secured to the inner casing wall 18 by a weld 24. With this arrangement the flow of heat by conduction from the combustors to the frame member 22 and the bearings carried therein is reduced to a minimum. At one end, frame member 22 serves to support a second journal bearing 25, also a thrust bearing assembly 26, the details of which will be more particularly described hereinafter in connection with Figs. 3 and 4.

At its right-hand end, frame member 22 is secured to another cylindrical frame member 27, at the other end of which is supported a third journal bearing 28. Welded to the cylindrical frame member 27, in the neighborhood of the journal bearing 28 is a radially extending annular plate member 29 which has a circumferential row of openings around each of which is welded one end of a short cylinder member having at the other end a flange adapted to support the turbine end of the outer combustor casing. To the outer circumference of the plate 29 is welded a cylinder 30 which entirely surrounds the transition end of the combustion system. At its other end, cylinder 30 is welded to a continuous ring 31, to which is secured a main frame ring 32 by a plurality of threaded fastenings 33, in a manner which will be apparent from Fig. 2.

While the transverse plate 29 and axially extending cylinder 30 help to support the frame ring 31 from the inner frame cylinder 27, a principal portion of the support between these members is provided by a plurality of circumferentially spaced diagonally extending ribs or braces 34, there being one such brace between each pair of adjacent combustors. At its left-hand radially inner end, each strut is welded to the left-hand end of the frame cylinder 27, in a manner which will be apparent from Fig. 2. The intermediate portion of each strut is provided with an inwardly extending portion 34a welded to the radial plate 29. At its outer end, the strut has an axially extending portion 34b welded to the outer surface of frame cylinder 30, and to the adjacent face of the frame ring 31. Thus it will be apparent that members 34, 29, 30, and 31 provide an extremely rigid frame for supporting the main frame ring 32 in fixed relation to the inner cylindrical frame member 37.

Secured to the main frame ring 32 by the bolts 33 is an interstage turbine casing indicated generally at 35 in Fig. 2. This casing is formed in two halves, divided along a vertical plane through the axis of the turbine and secured together by a plurality of threaded fastenings 36. At its downstream side, interstage casing 65 is provided with a second radially extending flange secured by bolts 37 to a second integral main frame ring 38. Welded to the exterior face of ring 38 adjacent the inner periphery thereof is an exhaust casing fabricated of comparatively thin flexible sheets including a somewhat conical external wall 39, a cylindrical inner wall 40 and a discharge scroll 41 with a flanged outlet opening 42.

Projecting diagonally across the annular exhaust passage defined by walls 39, 40 are a plurality of circumferentially spaced radially and axially extending struts or ribs 43. It is convenient to use six of these struts, the same number as there are of the struts 34. At the radially outer end, each strut 43 is secured, as by bolting or welding, to the ring 38. Each of these struts projects through an opening in the outer exhaust casing wall 39 and through a second opening in the inner exhaust casing wall 40. Surrounding each strut in spaced relation thereto is a cooling air shroud 44 which projects through the respective openings in the exhaust casing walls 39, 40 and is welded to the peripheries thereof. These shrouds 44 form a cooling air path surrounding each strut 43 and serve to support the inner exhaust casing wall 40 from the outer casing wall 39. A plurality of guide vanes 45 are welded to the air shrouds 44 and serve to direct the turbine exhaust fluid smoothly outward into the exhaust scroll 41.

At their radially inner ends, the struts 43 are welded to an integral conical frame member 46. At its exterior end, this conical casing is provided with a heavy flange 47 to which is secured the housing 48 of the exhaust end journal bearing 49. The bearing housing 48 is for convenience divided into two halves along a horizontal plane and secured together by threaded fastening 50. The lower half of the bearing housing is provided with a projecting boss 51 which forms a socket for receiving a ball member 52 secured to an end support pedestal 53. It will be apparent that the ball and socket arrangement 51, 52, 53 provides one support point for the powerplant which is fixed in all three dimensions. The end of bearing housing 48 is closed by a cap member 54, which may also be formed in two halves bolted together at a horizontal plane. Also secured to the end ring 47 of the frame member 46 is a labyrinth casing 55 provided with seal members for preventing the flow of oil vapors from bearing 49 to the left into the cooling air passages described hereinafter.

In addition to the universal ball support 51, 52, 53, the powerplant is carried at two other points in a manner which need not be described more fully here, since it is covered in the above-mentioned Patent 2,632,997 of Alan Howard and Bruce O. Buckland.

It will be apparent from the above description that the powerplant has a complete integral frame-work consisting of the compressor casing 1, 10, 11, the intermediate casing member 13, the axially extending frame cylinder 27, the radially extending ribs 34, main frame rings 32, 38 with the interstage casing 35 between, the radially and axially extending ribs 43, the conical casing member 46 and the bearing housing 48, 54. These members are designed to provide adequate rigidity so that no external frame or foundation need be relied upon to maintain the bearing alignment. It will, of course, be appreciated by those skilled in the art that the problem of maintaining bearing alignment in such a powerplant is quite serious where the axial length of the machine is so great and the compressor and turbine rotors are so massive that four or more axially spaced bearings are required.

The complete rotor assembly for the powerplant includes the axial flow compressor rotor, turbine rotor, a main coupling assembly for securing the turbine rotor and compressor rotor in driving relation, coupling means for connecting the exhaust end of the turbine rotor to a load output device, first and second journal bearings supporting the compressor rotor, third and fourth journal bearings supporting the turbine rotor, a thrust bearing assembly located intermediate the second journal bearing and the main coupling assembly, and various bearing seals and rotor cooling arrangements.

The axial flow compressor, shown in partial section in Fig. 1, is somewhat of a "hybrid" between the well-known "drum type" and the equally well-known "disc type" of turbo-machine rotor. Like the drum type, it has no central shaft extending entirely through the rotor, yet it is like the disc type in that it is built of separately fabricated disc members, each carrying a circumferential row of moving blades. As will be apparent from Fig. 1, the discs are maintained in coaxial relation by an interfitting rabbeted hub portion and are held together by a plurality of longitudinal through-bolts. The construction of this rotor need not be described further here, since it is covered in more detail in the application of Alan Howard and Chester S. Rice, Serial No. 79,766, filed March 5, 1949, now abandoned and opened to public inspection in accordance with the Commissioner's notice of January 25, 1949. It is to be noted, however, that, at either end, the compressor rotor has a disc member with an axially extending portion defining a supporting journal. At the compressor inlet end, the end disc member 56 has a journal bearing portion 57 supported in inlet end bearing 6. The discharge end disc member 58 similarly has a journal portion 59 supported in the second journal bearing 25 (see Fig. 2).

The complex bearing and coupling assembly housed within the intermediate casing member 22 may be better seen in the enlarged detail view of Fig. 3. The casing member 22 supports an inner bearing casing 60, which is not an integral casting but is formed in two halves split on a horizontal plane and secured together by bolts 61. This divided casing provides the supporting means for the labyrinth seal 62 and the journal bearing 25, in a manner which will be apparent from Fig. 3.

The bearing casing 60 is supported coaxially in the frame member 22 by means of three or more longitudinal key members, one of which is shown at 63, Fig. 3, and may be seen partly in elevation in Fig. 4, which view is taken on the irregular plane 4—4 in Fig. 3. The key 63 is seated in a longitudinal groove 64 in the outer circumference of casing 60, and may be secured by a machine screw 65. Key 63 also projects radially outward and into a cooperating groove 66 in casing 22. As may be seen in Fig. 4, the parallel side surfaces of key 63 snugly engage the cooperating surfaces of groove 66. With three or more circumferentially spaced keys, as shown at 63a, 63b in Fig. 4, the inner bearing casing 60 will be supported exactly coaxial with the frame cylinder 22, regardless of any differential thermal expansion between frame member 22 and bearing casing 60. Furthermore, with these key members forming the support for the bearing casing 60, the flow path for the transmission of heat by conduction from the combustion system from the bearings is made to have very high resistance. This is, of course, desirable, in that the bearings and the alignment thereof will not be adversely affected by heat from the combustion system.

Air for pressurizing the labyrinth seal member 62 is supplied through a succession of drilled passages 67 in casing 60. Aligned with the exterior end of passage 67 is a hole 68 extending radially through the key 63. A cooperating passage 69 is formed in the casing 22 and supplies air under pressure to the passage 67. This pressurizing air may be derived from the compressor by a suitable conduit (not shown). In order to seal the space between key 63 and recess 66 at the place where this pressurizing air enters the hole 68, an annular packing washer 70 is provided. This washer is slidably seated in the recess 68 in key 63 and is biased radially outward into contact with the bottom surface of groove 66 by means of a coil spring 71 seated in recess 68, as shown in Fig. 3. Since the bearing casing 60 is split, while the frame member 22 is an integral casting, it is necessary in assembly to bolt the two halves of casing 60 together, assemble the keys 63, 63a, 63b, etc. in their respective keyways, and then slide the whole assembly axially into place in the frame member 22. During this process the spring-biased washer 70 may be depressed so as to be flush with the outer surface of key 63. The casing 22 with its keys is then slid axially into the frame member 22, whereupon spring 71 biases the packing washer 70 radially outward to perform the sealing function intended.

The inner bearing casing 60 also serves to support the thrust bearing assembly indicated generally at 26. The rotor assembly is positioned axially, and the axial thrust loads are taken by, a thrust flange 72 formed integral with an intermediate portion of the rotor end member 59. Cooperating with the opposite faces of thrust flange 72 are babbitt-lined thrust bearing members 73, 74. These members are not continuous rings but are divided along a horizontal plane through the axis of the rotor, as may be seen in Fig. 4. Each of the members 73, 74 is provided with a seal in the form of a segmental ring 75, 75a located in an annular groove with close clearances between the ring and the sides of the groove but appreciable radial clearance between ring and groove. The inner periphery of rings 75, 75a engage shaft 59 with a fit which permits free sliding but with a clearance sufficiently small to substantially prevent oil leakage therethrough. The thrust bearing members 73, 74 form a rabbet fit with an intermediate spacer member 76. Members 73, 74 and the spacer 76 are held together by a circumferential row of bolts 77, as may be seen in Figs. 3 and 4.

While the thrust members 73, 74 are divided along a horizontal plane, as shown in Fig. 4, the intermediate spacer ring 76 is divided into segments along a vertical plane. Thus when members 73, 74, 76 are clamped together by the bolts 77, they form an integral assembly surrounding the shaft portion 59.

To provide the degree of flexibility required of the thrust bearing when the powerplant is used for locomotive application or in other places where it must be mounted on a bed of appreciable flexibility, the thrust bearing members are carried by a gimbal mount which provides freely self-aligning support. This gimbal support includes the following members. Formed integral with the intermediate spacer ring 76 are a pair of diammetrically opposite gimbal trunnions, one of which is shown in dotted lines at 78 in Fig. 4. These trunnions are pivotally supported in side frame members 79, one of which is also shown in Fig. 4. The side frame member 79 is secured, as by suitable threaded fastenings 80, to the ends of arcuate ring members 81, 82. It will be apparent that the members 79, 81, 82 form the gimbal frame. At diammetrically opposite intermediate portions, the segments 81, 82 are provided with trunnions 83, 84. These are pivotally supported in bosses 85, 86 in a manner which will be apparent from Figs. 3 and 4.

As will be apparent from the drawings and the above description of the bearing support arrangement, the casing 60 is free to slide axially on the radial keys 63, 63a, 63b, etc. relative to the casing 22. In order to locate these two casings accurately relative to one another, an axially extending "locating cylinder" 86 is provided. This has at one end a flange which is bolted to the casing 60 (before casing 60 is inserted into the frame cylinder 22) by means of threaded fastenings 87. After the rotor end member, with the bearing casing 60 assembled thereto, is inserted into casing 22, the other end flange of the locating cylinder 86 may be secured to the end flange 22a of the casing 22 by means of a plurality of suitable threaded fastenings, such as machine screws 88 which are inserted from the open right-hand end of the flange 22a, the heads being recessed into the flange as shown in Fig. 3. It will be apparent that cylinder 86 prevents any longitudinal displacement of the bearing casing 60 relative to the outer frame casing 22.

The end flange 22a of casing 22 is secured by means of a plurality of threaded fastenings 89 to the end flange 27a of the main cylindrical frame member 27. At its right-hand end, main frame cylinder 27 carries the third journal bearing 28 by means of a plurality of threaded fastenings 90. Also carried by the right-hand end of cylinder 27 are radially inwardly extending walls forming a labyrinth seal 91 with the turbine rotor end portion 92. The mid-portion of seal 91 communicates with an annular chamber 93 by means of a plurality of circumferentially spaced holes 94. As will be apparent from Fig. 3, chamber 93 communicates through a tube 95 with cooperating passages 96 in the left-hand end flange of cylinder member 27, thence with the passage 69 in casing 22. Thus it will be apparent that the right-hand seal member 91 is also pressurized with air from the compressor.

Turning now to Fig. 2, it will be seen that the first stage bucket-wheel, indicated generally at 97, has a hub portion formed integral with a shaft extension 92, a first radially extending web portion to which is welded a circumferential rim portion, which in turn carries a circumferential row of buckets. This composite wheel structure is more fully described in United States Patent Number 2,432,315, issued December 9, 1947 in the name of Alan Howard and assigned to the same assignee as the present application.

The second-stage turbine bucket-wheel, indicated generally at 98, is also of this composite type and carries a circumferential row of shroudless buckets. Formed integral with the bucket-wheel 98 is an axially extending end portion 99 which serves a number of purposes. The extreme end of shaft portion 99 is supported in the fourth journal bearing 49, at the exterior side of which it is provided with a coupling flange 100 to which is bolted an internally splined coupling member 101. The input shaft 102 of a suitable load device (not shown) extends through the bearing end cap 54 and is provided with splines 103 engaging the cooperating splines of the coupling member 101.

As will be seen in Fig. 2, the bucket-wheels 97, 98 define a cylindrical rabbet with each other, whereby they are maintained in proper coaxial relation and are secured together by means of a circumferential row of studs 104 projecting through cooperating flanges formed integral with the bucket-wheels.

Projecting through a central axial bore in both bucket-wheels is a stud 105 which engages and is held concentric with the bore by means of a plurality of axially spaced circumferential lands 106. At the right-hand or exterior end of the turbine rotor, the stud 105 is provided with an end head 107 which is secured to the adjacent face of turbine rotor end portion 99 in the following manner. The head portion 107 is provided with two diammetrically opposite slots in which are located the two halves of a split washer 108. This washer is divided along a diameter, as shown in Fig. 5, so that the two halves can be assembled in a radial direction into the cooperating slots in the head 107. After being thus assembled, the split washer is secured by suitable threaded fastenings 109 to the adjacent end face of the rotor end portion 99, with a shim or shims, of suitable thickness interposed between, as indicated at 110 in Fig. 2. By proper selection of the thickness of shim 110, the whole turbine rotor including bucket-wheels 97, 98 and the end portions 92, 99 may be located axially as desired on the stud 105. This adjustment is required in order to permit proper selection of the clearance of the bucket-wheels with the associated stationary casing parts such as the nozzles which supply hot motive fluid to the buckets.

Attention is particularly directed to the fact that this important adjustment can be made from the exterior of the turbine by simply removing the bearing end cap 54, unfastening the coupling member 101 and sliding it to the right on the output shaft 102. Thus the critical nozzle-to-bucket clearances can be adjusted from the exterior of the powerplant with substantially no disassembly thereof. It will also be observed that the engagement of the split washer 108 with the slotted head 107 prevents rotation of the stud 105 relative to the turbine rotor after assembly.

Referring now again to Fig. 3, it will be seen that the left-hand or interior end of the stud 105 is provided with an end land 111 and a threaded portion 112. This threaded end portion engages the threaded bore of the coupling member 113, which serves a number of purposes. The central portion of member 113 forms a spherical socket for one ball end of a "thrust link" 114. Ball member 115 is held in the socket of member 113 by means of a retaining ring 116 secured by suitable threaded fastenings 117. Extending axially from the outer circumference of member 113 is a cylindrical portion 118 which has both internal splines engaging cooperating splines at 119 of the extreme end of rotor portion 92, and external splines at 120 engaging internal splines on the end of a "torque-tube" 121. The splined joint 119 is designed with sufficient clearances so that rotor end portion 92 may move axially on the stud 105 relative to the end coupling member 107, to a sufficient extent to permit the desired adjustment of the turbine bucket-wheel clearances by means of the shim 110, as described above. At the opposite end, torque-tube 121 is provided with another splined connection 122 with a coupling flange 123, the latter secured by bolts 124 to a coupling flange 125 formed integral with the extreme end of compressor rotor end member 59. The arrangement of the splines of the torque-tube 121 permits it to "float" freely in an axial direction; therefore, means are provided for positively locating it axially. This may be in the form of a threaded pin member 126 secured in the torque-tube 121 and having an unthreaded cylindrical end portion 127 projecting into a recess in the outer circumferential surface of coupling member 113. The left-hand end of thrust link 114 is provided with a second ball member 128, which is received in a central socket in the coupling flange 125 and retained in position by means of a ring 129 secured by threaded fastenings 130.

Thus it will be seen that torque is transmitted from the turbine rotor to the compressor rotor through the splined joints 119, 120, 122, while the two rotors are accurately positioned axially relative to each other by the rigid thrust link 114, which has a universal ball-and-socket connection with the respective rotors. This arrangement compensates for certain misalignment which may arise between the compressor and turbine rotors in initial assembly or may be caused by certain deflections in the powerplant casing due to exceptional stresses placed on the frame during operation on a comparatively flexible foundation such as the frame of a locomotive. By this provision of a thrust link for locating the rotors relative to each other, and for taking any net thrust which may occur on either the compressor or turbine rotor, it is possible to use only a single thrust bearing, that indicated at 26, as compared with prior art arrangements in which a separate thrust bearing would be required for each rotor. By thus eliminating one thrust bearing, a very appreciable saving in bearing friction power losses is effected. Cost and complexity is, of course, likewise reduced by the elimination of the extra thrust bearing with its related lubricating and sealing arrangements.

In order to reduce the power losses due to "windage," the torque-tube 121 and its associated coupling members are surrounded by stationary shields fabricated of sheet metal. These include a first shield 131 surrounding the coupling member 125, 123 and secured by a plurality of screws 132 to the end flange 22a of casing 22. A second cylindrical shield 133 is supported at its left-hand end by a plurality of radially extending brackets 134 screwed to the end flange 27a of the casing 27, the right-hand end of the shield being received in a cylindrical rabbet at 136.

It will be apparent from the above description that this rotor arrangement permits the use of a single thrust bearing located adjacent the mid-portion of the rotor assembly, so that any thermal expansion of the rotor will take place both to the right and to the left relative to the thrust bearing; and at the same time the thrust bearing assembly will not be subjected to temperatures as high as would be the case if it were located closer to the discharge end of the combustion system and the very hot turbine nozzles and bucket-wheels. The special torque-tube and thrust link arrangement for connecting the turbine and compressor rotors provides for a certain degree of mis-alignment between the rotors, while permitting the turbine rotor to be adjusted axially relative to the compressor so as to provide desired clearances between bucket-wheels and the stationary casing portions. The special arrangement for effecting this adjustment from the exterior end of the powerplant without substantial disassembly thereof is particularly important from the standpoint of ease of maintenance.

While a single embodiment of the invention has been described in detail herein, it will be obvious to those skilled in the art that many changes and substitutions of equivalents might be made; and it is desired to cover by the appended claims all such modifications as fall within the true spirit and scope of the invention.

What we claim as new and desire to secure by Letters Patent of the United States is:

1. In a turbine powerplant, the combination of a frame with first, second, third, and fourth axially spaced radial bearing means and a single thrust bearing means located intermediate said second and third radial bearings, a rotor assembly comprising a compressor rotor of substantial axial length, one end of said compressor rotor having a first axially extending portion supported in the first bearing, the other end of said rotor having a second axially extending portion supported in the second bearing with thrust surfaces cooperating with the thrust bearing means and a first coupling flange member at the extreme end thereof located between the thrust bearing and the third radial bearing, a turbine rotor having a third axially extending portion supported in and projecting through the third bearing toward said first coupling member, the turbine rotor having also a fourth axially projecting portion at the opposite end thereof and adapted to be supported in the fourth bearing means, a thrust link with one end portion flexibly connected to said first coupling flange member, a stud slidably projecting through a central bore in the turbine rotor and having a second coupling flange member flexibly connected to the other end of the thrust link, said stud extending entirely through the turbine rotor and having at the exterior end thereof a radially extending flange member with a surface parallel to an adjacent end surface of the fourth rotor portion, shim means interposed between said parallel surfaces whereby the turbine rotor may be accurately positioned axially on the stud by insertion of a shim of suitable thickness, a torque tube member surrounding the thrust link and having at one end a splined connection with the first coupling flange member and at the other end a second splined connection with said second coupling flange member, the third rotor portion having an end portion forming a third splined connection with the second coupling flange member, whereby the turbine rotor may be positioned axially on the stud by insertion of a suitable shim from the exterior of the machine without material disassembly thereof or change in the compressor rotor location.

2. In an elastic fluid turbine, the combination of a frame with first and second axially spaced radial bearings and a thrust bearing axially spaced from one of the radial bearings, a rotor assembly comprising a rotor member having a first axially extending end portion supported in the first bearing and projecting therethrough toward the thrust bearing, the other end of the rotor having a second axially extending portion supported in the second bearing and having an extreme end portion at the exterior side of the second bearing remote from the first bearing and defining a surface lying in a plane normal to the axis of the rotor, said rotor having limited axial sliding movement in said radial bearings, a rotor locating stud arranged in a central bore extending entirely through the rotor, a first coupling member carried by the extreme end of the rotor stud at the exterior side of the first bearing remote from the second bearing, means connected to said first coupling member to locate the rotor stud axially relative to the thrust bearing, and a member carried by said rotor locating stud at the exterior side of the second bearing and having a radially extending surface parallel to said normal end surface of the second rotor portion, and shim means interposed in abutting relation between said last-mentioned member and said normal end surface of the second rotor end portion whereby the rotor may be accurately located axially relative to the stud by insertion of a shim of suitable thickness.

3. In an elastic fluid turbine, the combination of a frame with first and second axially spaced radial bearings and thrust bearing means axially spaced from one of the radial bearings, a rotor having at the respective ends thereof first and second axially extending portions projecting through and supported in said first and second radial bearings respectively, said rotor having a central axial bore extending entirely therethrough, a rotor locating stud slidably disposed in the rotor bore and projecting from each end thereof, means connected to one projecting end of the locating stud for positioning it axially relative to the thrust bearing means, the other projecting end of the stud having a radially extending portion adjacent the exterior end of the second rotor end portion remote from the first bearing, and means associated with said last-mentioned stud and rotor end portions for adjusting the rotor axially relative to the stud whereby the rotor may be accurately positioned axially in said radial bearings relative to the thrust bearing and frame.

4. In a turbine powerplant, the combination of a frame with first, second, third, and fourth axially spaced radial bearing means and a single thrust bearing adjacent the second radial bearing, a rotor assembly including a compressor rotor of substantial axial length, one end of said rotor having a first axially extending portion supported in the first radial bearing, the other end of said rotor defining a second axially extending portion supported in the second radial bearing, said rotor also having portions with radially disposed thrust surfaces cooperating with the thrust bearing means and a first flanged coupling member at one extreme end of the compressor rotor located between the thrust bearing and the third radial bearing, a turbine rotor having a third axially extending portion supported in and projecting through the third bearing towards said first coupling member, the turbine rotor having also a fourth axial projection at the opposite end thereof and supported in the fourth bearing, a thrust link having two ends disposed between the adjacent ends of the compressor and turbine rotors and having a self-aligning connection at one of its ends with said first coupling flange member, a stud slidably projecting entirely through a central bore in the turbine rotor and having a second coupling flange member secured by a self-aligning connector to the other end of the thrust link whereby the stud is positioned axially relative to the thrust bearing, said stud having at the exterior end of the turbine rotor remote from the compressor rotor a radially extending flange member with a surface parallel to an adjacent end surface of said fourth rotor portion, shim means interposed in abutting relation between said parallel surfaces whereby the turbine rotor may be accurately positioned axially on the stud by insertion of a shim of suitable thickness, a torque tube member surrounding the thrust link and having at one end a splined connection with said first coupling flange member and at the other end a splined connection with the turbine rotor stud, said third rotor portion forming a third splined connection with the end portion of the stud member, whereby the turbine rotor stud is accurately positioned axially relative to the thrust bearing by said thrust link and torque is transmitted by said torque tube from the turbine rotor to the compressor rotor.

5. In a turbine powerplant, the combination of a frame with first, second, third, and fourth axially spaced radial bearings with a single thrust bearing means located adjacent said second bearing, the combination of a rotor assembly including a compressor rotor of substantial axial length with a first axially extending portion supported in the first bearing and a second axially extending portion supported in the second bearing, the compressor rotor having also a member forming thrust surfaces cooperating with the thrust bearing means and a first coupling flange member at the extreme end of the compressor rotor adjacent the third radial bearing, a turbine rotor having third and fourth axially extending end portions supported in said third and fourth bearings respectively, a thrust link coaxially disposed between the compressor and turbine rotors with one end having a self-aligning connection to said first coupling flange member, a turbine locating stud slidably projecting through a central bore in the turbine rotor and having at the interior end thereof a second coupling flange member with a self-aligning connection to the other end of the thrust link, said stud having an end portion projecting from the exterior end of the turbine rotor, and adjusting means connected to said exterior stud end portion for shifting the turbine rotor axially on the locating stud to alter the turbine rotor clearances, a coaxial torque tube member surrounding the thrust link and having at one end thereof a splined connection with said first coupling flange member and at the other end a second splined connection with said second coupling flange member, the turbine rotor end portion projecting through the third bearing having a third splined connection with said second coupling flange member, said third splined connection being adapted to effect said axial adjustment of the turbine rotor on said locating stud.

6. In an elastic fluid turbine, the combination of a frame with first and second axially spaced radial bearings and a thrust bearing axially spaced from one of the radial bearings, a rotor assembly including a turbine rotor member having first and second axially extending end portions supported in said first and second bearings respectively, said rotor having limited axial sliding movement in said bearings, a rotor locating stud disposed in a central bore and extending entirely through the turbine rotor, a first coupling member carried by the extreme end of the rotor stud at the exterior side of the first bearing remote from the second bearing, locating means flexibly connected to said first coupling member to position the rotor stud axially relative to the thrust bearing means, the rotor locating stud having a second end portion projecting from the turbine rotor at the side remote from the first coupling member, and means connected to said second stud end portion for adjustably positioning the turbine rotor on the locating stud whereby the rotor may be positively located relative to the thrust bearing from the exterior end of the turbine and without substantial disassembly thereof.

BRUCE O. BUCKLAND.
CHESTER S. RICE.

References Cited in the file of this patent
UNITED STATES PATENTS

| Number | Name | Date |
|---|---|---|
| 1,328,285 | McClave | Jan. 20, 1920 |
| 2,483,616 | Bergstedt | Oct. 4, 1949 |
| 2,490,503 | Barnes | Dec. 6, 1949 |
| 2,550,580 | McLeod et al. | Apr. 24, 1951 |